(12) United States Patent
Mills et al.

(10) Patent No.: US 7,395,358 B2
(45) Date of Patent: Jul. 1, 2008

(54) INTELLIGENT STORAGE ENGINE FOR DISK DRIVE OPERATIONS WITH REDUCED LOCAL BUS TRAFFIC

(75) Inventors: Andy Mills, San Jose, CA (US); Kent P. Fischer, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/316,436

(22) Filed: Dec. 22, 2005

(65) Prior Publication Data

US 2006/0143316 A1    Jun. 29, 2006

Related U.S. Application Data

(60) Provisional application No. 60/640,634, filed on Dec. 29, 2004.

(51) Int. Cl.
G06F 3/00 (2006.01)
(52) U.S. Cl. .................. 710/5; 710/1; 710/22; 711/112; 711/114; 712/225; 709/221
(58) Field of Classification Search ............. 710/5, 710/1, 22; 711/114, 112; 712/225; 709/221
See application file for complete search history.

(56) References Cited

U.S. PATENT DOCUMENTS

| 4,942,579 | A | * | 7/1990 | Goodlander et al. ........ 714/805 |
| 5,522,058 | A | | 5/1996 | Iwasa et al. ................. 395/472 |
| 5,806,086 | A | | 9/1998 | Kimmel et al. ............. 711/145 |
| 5,892,969 | A | | 4/1999 | Young ......................... 395/825 |
| 6,018,778 | A | | 1/2000 | Stolowitz |
| 6,065,083 | A | | 5/2000 | Garcia et al. ................. 710/126 |
| 6,098,114 | A | | 8/2000 | McDonald et al. |
| 6,108,697 | A | * | 8/2000 | Raymond et al. ............ 709/218 |
| 6,219,727 | B1 | | 4/2001 | Kailash et al. ................ 710/48 |
| 6,237,052 | B1 | | 5/2001 | Stolowitz |
| 6,385,683 | B1 | | 5/2002 | DeKoning et al. .......... 710/261 |
| 6,389,509 | B1 | * | 5/2002 | Berenguel et al. ........... 711/113 |
| 6,772,108 | B1 | | 8/2004 | Stolowitz |
| 6,904,498 | B2 | | 6/2005 | Stolowitz |
| 6,920,537 | B2 | * | 7/2005 | Ofek et al. ................... 711/163 |
| 6,987,927 | B1 | * | 1/2006 | Battaglia et al. ............ 386/117 |

(Continued)

FOREIGN PATENT DOCUMENTS

WO    WO2004/095255    11/2004

OTHER PUBLICATIONS

PCT Written Opinion from related application which was mailed on Feb. 8, 2007.

(Continued)

Primary Examiner—Alford Kindred
(74) Attorney, Agent, or Firm—Zilka-Kotab, PC (57) ABSTRACT

For attached disk drive operations such a file copy and move, as well as more elaborate processes such as searching, virus-scanning and volume merge, a novel intelligent storage engine concept is disclosed. In one embodiment, a storage engine (40), utilizing local processor intelligence, and accessed through a suitable driver (60) and API (App. B), carries out disk access operations without burdening the host CPU (22) and without imposing data traffic on the local CPU bus (34), except for returning results data in an appropriate case.

24 Claims, 5 Drawing Sheets

U.S. PATENT DOCUMENTS

| | | | |
|---|---|---|---|
| 2003/0089675 A1* | 5/2003 | Koestler | 213/201 |
| 2003/0191957 A1* | 10/2003 | Hypponen et al. | 713/200 |
| 2004/0064590 A1 | 4/2004 | Starr et al. | 709/250 |
| 2004/0148420 A1 | 7/2004 | Hinshaw et al. | 709/231 |
| 2004/0264309 A1 | 12/2004 | Stolowitz | 369/36.01 |
| 2005/0033975 A1* | 2/2005 | Lahti et al. | 713/200 |
| 2005/0097273 A1* | 5/2005 | Kanai | 711/114 |
| 2005/0144223 A1 | 6/2005 | Yang et al. | 709/203 |
| 2005/0240740 A1* | 10/2005 | Takeda et al. | 711/162 |
| 2006/0095705 A1* | 5/2006 | Wichelman et al. | 711/171 |

OTHER PUBLICATIONS

PCT International Search Report from related application which was mailed on Feb. 6, 2007.

International Preliminary Report on Patentability from PCT Application No. PCT/US2005/046931 which was mailed on Jul. 12, 2007.

* cited by examiner

INTELLIGENT STORAGE ENGINE FOR DISK DRIVE OPERATIONS WITH REDUCED LOCAL BUS TRAFFIC

RELATED APPLICATION

This application claims priority from U.S. Provisional Application No. 60/640,634 filed Dec. 29, 2004 and incorporated herein by this reference in its entirety.

COPYRIGHT NOTICE

© 2005-2006 NETCELL™ Corporation. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

The invention pertains to digital computing systems and, in particular, to methods and apparatus to reduce local bus traffic in connection with selected disk drive operations.

BACKGROUND OF THE INVENTION

Many modern computing machines, including for example desktop or laptop personal computers, employ one or more hard disk drives to store the operating system, application programs and data files. In sonic cases, multiple disk drives may he connected to a single PC as a means to separate operating system from data files, as a dedicated audio-video disk file, or coupled together in a RAID configuration to improve performance and reliability. Disk drives can be deployed internally to the machine, externally, as a removable device, and so on in a wide variety of configurations. For purposes of this application, all such arrangements are considered "attached" drives. In other words, we use the term "attached" herein to mean that data can be transferred between the local bus and the attached drive(s) without the data traversing a network. A removable drive is still considered "attached" for present purposes. Further, in this application, storage devices such as disk drives that are coupled to a host by way of IEEE® 1394, USB, SATA or other types of connections are still considered as directly "attached" as distinguished from network attached.

Regardless of the number, types and arrangements of attached disk drive storage systems, there are many host applications or operations that involve movement of data (or copy) from one location on one disk drive to another location on the same drive, to another logical partition, or to a physically separate disk drive. Other common operations include searching for specific data within files stored on the hard drive(s), or synchronizing files in a backup application. Examples of such operations or applications include file copy, moves, disk drive defragmentation, anti-virus scans, data scan (search), and data migration/conversions.

Known implementations of the above applications require the involvement of the host CPU and can significantly load the host bus to which the disk drive(s) is (are) attached. (We use the terms "host bus" and "local bus" interchangeably in this application. There are many such buses, of which the PCI bus is a well-known example.) Disk operations that burden the CPU and force heavy traffic on the local bus consequently causes other applications not related to the file movement operation to slow down, as the same host data bus used to perform these background operations is also used by other applications. For example, one of the most common complaints about backup and antivirus applications as they exist today is that they are often obtrusive, i.e. they interrupt the current application and often drag high speed computers down in performance due to the amount of data that needs to be sent back and forth across the system bus. Worst still, these basic operations can cause excessive disk swapping to occur if system memory is near full when a scan or backup process begins execution.

Figure 1:
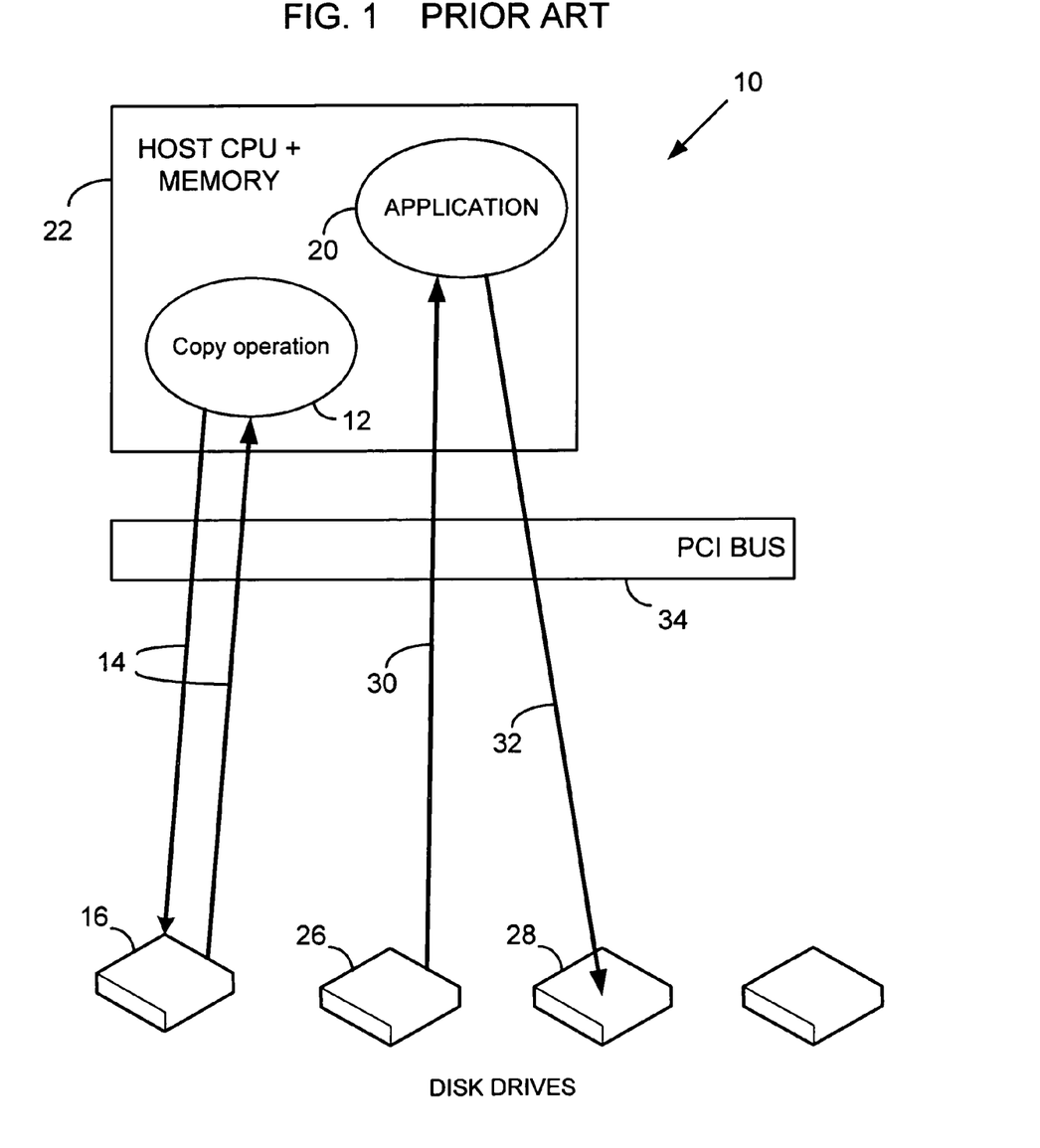
FIG. 1 is a simplified conceptual diagram of a host system and attached DAS disk drives (prior art).

To illustrate, FIG. 1 shows a computer and attached disk drives in a simplified conceptual diagram 10. The diagram shows a file copy operation 12 underway, evidenced by a pair of data streams 14, to and from a disk drive 16. In addition, an application 20 is running which causes the CPU 22 to carry out various reading, writing and processing of other data variously stored on drives 26 and 28. Read and write operations involving those drives give rise to additional data streams illustrated as 30, 32. All four data streams in this illustration contribute to traffic over the local bus 34.

The need remains for improvements in computer system performance by intelligent application of hardware and software to better utilize available resources. If the burden imposed on the CPU and its local bus by certain common applications and operations, in particular those involving data transfer to and from attached storage devices, could be alleviated, overall system performance will be significantly improved.

Additional aspects and advantages will be apparent from the following detailed description of preferred embodiments, which proceeds with reference to the accompanying drawings.

DETAILED DESCRIPTION OF PREFERRED EMBODIMENTS

The shortcomings and limitations of the prior art can be addressed by various embodiments of a novel intelligent storage engine concept. The storage engine, utilizing local processor intelligence, accessed through a suitable API, carries out disk access operations without burdening the CPU and without imposing data traffic on the local CPU bus, except for results data in an appropriate case.

The present invention applies to PC based storage or the like where a hard drive is closely coupled or directly attached to the host CPU's internal local bus or external expansion port supporting an external directly attach storage, referred to as "direct attached storage" or DAS. Such a CPU internal bus might be, for example, one of the PCI family of bus specifications. An external port may for example be a USB2, 1394 or external serial ATA port.

Figure 2:
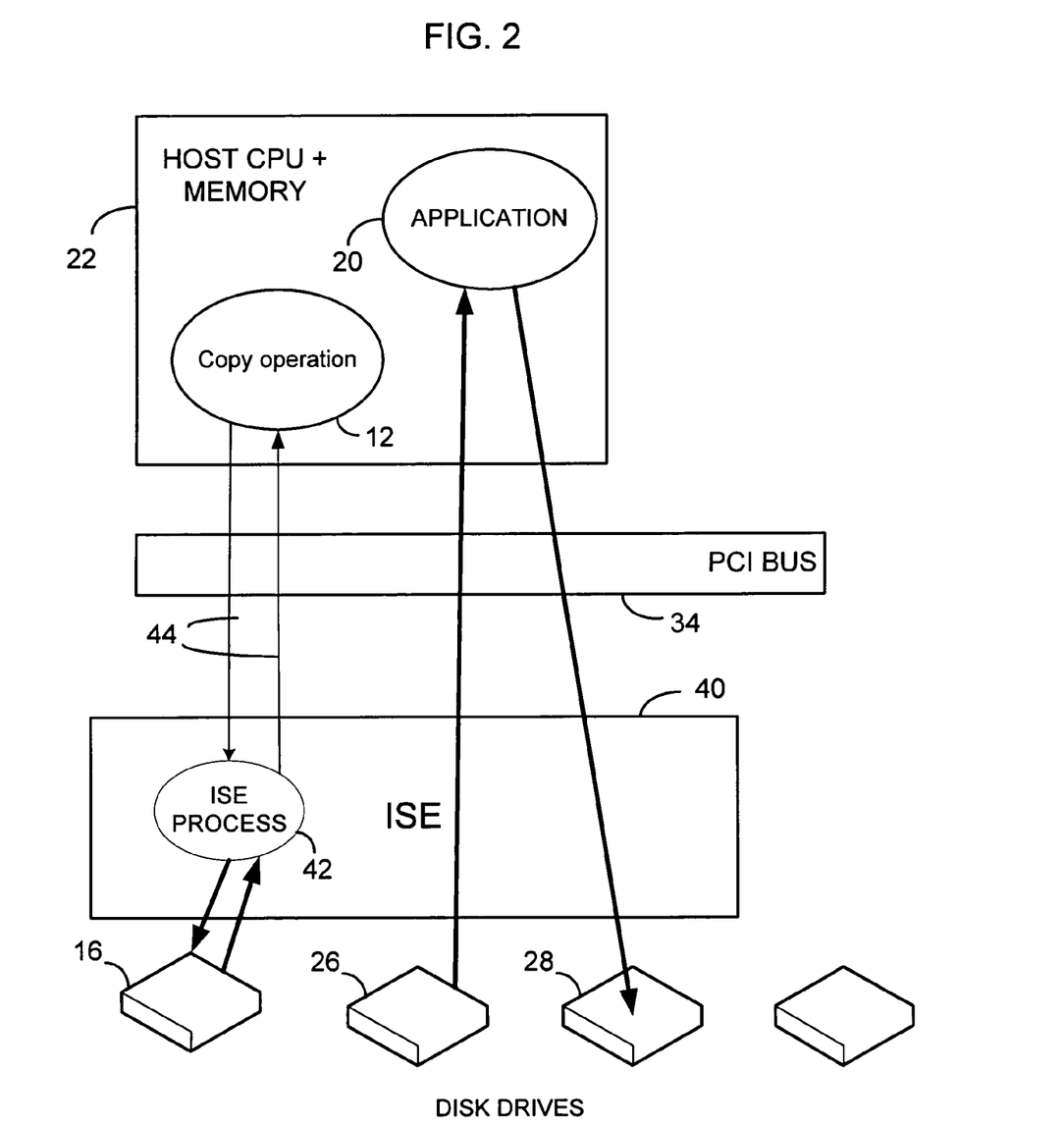
FIG. 2 is a simplified conceptual diagram of a host system and attached DAS disk drives employing an "Intelligent Storage Engine" (hereinafter "ISE") in accordance with one embodiment of the present invention.

Conceptually, the present invention can be illustrated by drawing FIG. 2. The figure shows the same host as FIG. 1, with the same file copy operations and application running as described above. The essential difference relates to the ISE (Intelligent Storage Engine) 40, a combination of hardware and software logically deployed in between the local bus 34 and the disk drives 16,26,28 in the example. The file copy process 12 of FIG. 1 is no longer carried out by the CPU with data flowing back and forth across the local bus 34. Here, a new ISE process 42 is carrying out the file copy operation instead, and the data streams no longer traverse the local bus, so local bus and CPU loading are reduced. The copy is carried out by the ISE, with only a very few high-level commands 44 over the local bus. A simple response from the ISE can signal completion of the operation. In this example, no user data traverses the local bus to execute the copy operation 12.

Thus, in one aspect, the present invention can be implemented using a dedicated, independent processor or "storage engine" that can offload certain disk related functions from the host CPU, thereby reducing the overhead and loading on the CPU and the host bus to which the drives are normally attached.

In another aspect of the invention, a storage engine is supported in such a fashion that is transparent to applications. In a further aspect of the invention, the storage engine can perform enhanced functions via an applications programming interface, so as to increase the overall performance of the PC. A host application, library function, device driver or the like can take advantage of the ISE preferably through a suitable API.

For example, a single command "DS_DiskdataBlock-Copy" can be used for the CPU to instruct the ISE to copy a block of data from source to destination locations on the drive 16 (or another drive). (See below for illustrative API functions and possible syntax.)

An ISE consistent with the present invention generally comprises a host interface for connection to a host CPU bus or "local bus"; a drive interface for connection to one or more disk drives; and a processor, local to the ISE. See FIG. 3. In other words, the ISE processor is distinct from the host CPU or processor. The ISE can also include local cache memory in some embodiments. And the ISE can include other memory for storing software, such as FLASH memory, by way of example.

The host interface, in one embodiment, implements a standard interface such as ATA, fastATA, ATAPI etc. which are well known interfaces for storage devices. In accordance with one alternative embodiment, the host interface implements a serial link interface; for example, a SATA interface.

In general, as explained in greater detail below, the ISE offloads certain tasks from the host for direct storage attached applications. This relieves load on the host CPU and reduces traffic on the host local bus, e.g. a PCI bus, to improve system performance.

In one presently preferred embodiment, host applications or the host operating system can make direct calls to the ISE. A variety of custom applications and processes can be deployed, again with little or no burden on the host. Examples include virus scanning, backup synchronization support, migration, indexing, defragmentation, and so on. Virtually any operations that impose heavy traffic on the CPU local bus between the CPU and attached disk drive storage can be wholly or partially offloaded to the ISE to improve overall system performance.

On the drive side, almost any configuration of one or more disk drives can be deployed, depending on the disk controller capabilities at hand.

RAID functionality can be advantageously implemented in a controller device (integrated circuit, ASIC, SOC, PCB, etc) that also implements ISE functions.

Advantages of the invention include the following:

Copying or backup of large multi-gigabyte video files no longer dominates the host bus or CPU.

Streaming data support with reduced host CPU involvement.

Antivirus programs can be run in background without interrupting applications.

Active scanning of data as it traverses interface to drives (antivirus).

Background defragmentation can occur on a more frequent basis.

Figure 3:
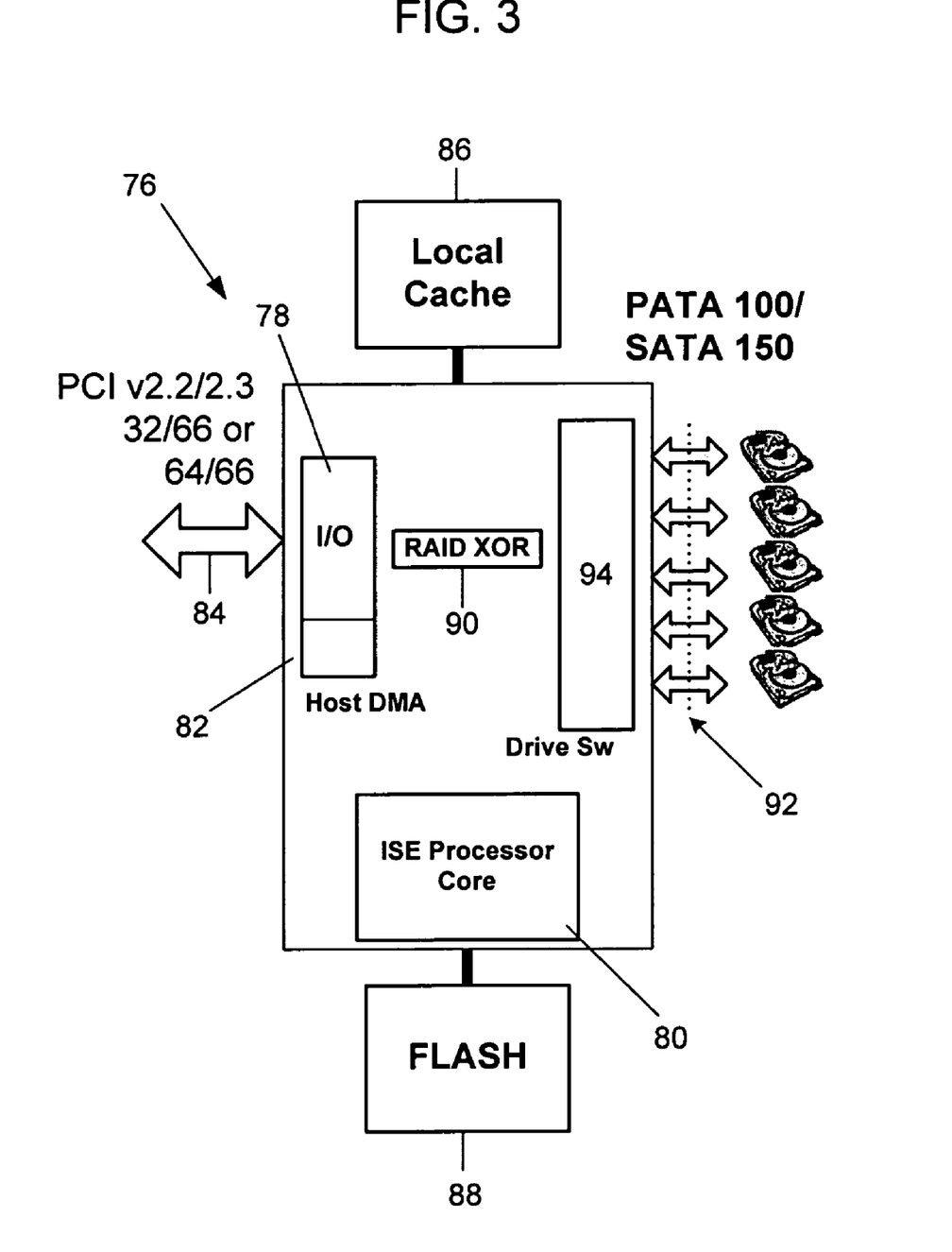
FIG. 3 is a simplified hardware block diagram illustrating one embodiment of an ISE consistent the present invention.

FIG. 3 is a simplified hardware block diagram illustrating one embodiment of an ISE 76. In a presently preferred embodiment, the ISE includes an ISE Processor Core 80 which may comprise, for example, a 66 MHz or 100 MHz IP core processor. The engine has a host interface 78 for interfacing to a host local bus 84, such as the PCI bus commonly used in personal computers and other microprocessor based systems. A host DMA block 82 implements DMA operations with the local bus (or "CPU bus"—used synonymously herein). A local cache memory 86 can be accessible to, or provided within, the storage engine for data buffering to optimize overall system performance. SDRAM or the like can be used for data buffering in a data path between the host interface a the drive interface. For current technologies, on the order of 512 MB of cache should suffice, although this can be expected to change as storage and related interfaces evolve. In addition, a local software store, for example using FLASH memory 88, preferably is implemented to store and update software executable by the ISE processor 80. Various forms of ROM could be used as well.

The host interface 78 can implement ATA emulation, if desired, as described in commonly-assigned U.S. Pat. No. 6,772,108 B1 entitled, "RAID Controller System and Method with ATA Emulation Host Interface, incorporated herein by this reference.

In one embodiment, the data path bandwidths can be 800 MB/s cache; 533 MB/s host; and 400 MB/s drive. The block 90 labeled "RAID XOR" refers to means for implementing RAID operations, preferably "on the fly" in the data path. On-the-fly XOR redundancy operations for disk drive storage systems are described in U.S. Pat. No. 6,018,778 incorporated herein by this reference.

The disk drive interface 92 can take various forms. In a simple example, it comprises a standard ATA interface for connection to a maximum of four IDE disk drives. It can comprise one or more UDMA interfaces; or one or more SATA interfaces; or other technologies. The ISE concept of the present invention can be applied to any desired disk drive/drive interface technology useful in DAS systems.

The block labeled drive switch 94 essentially comprises data path switching and mapping functions as described in applicant's PCT International Publication No. WO 2004/095255 A2 and counterpart U.S. Patent Application Publication No. US-2004-0264309 A1, both incorporated herein by reference. In a presently preferred commercial embodiment, a RAID XOR engine is included in this drive switch 94, although it is shown as a separate block in FIG. 3.

Figure 4:
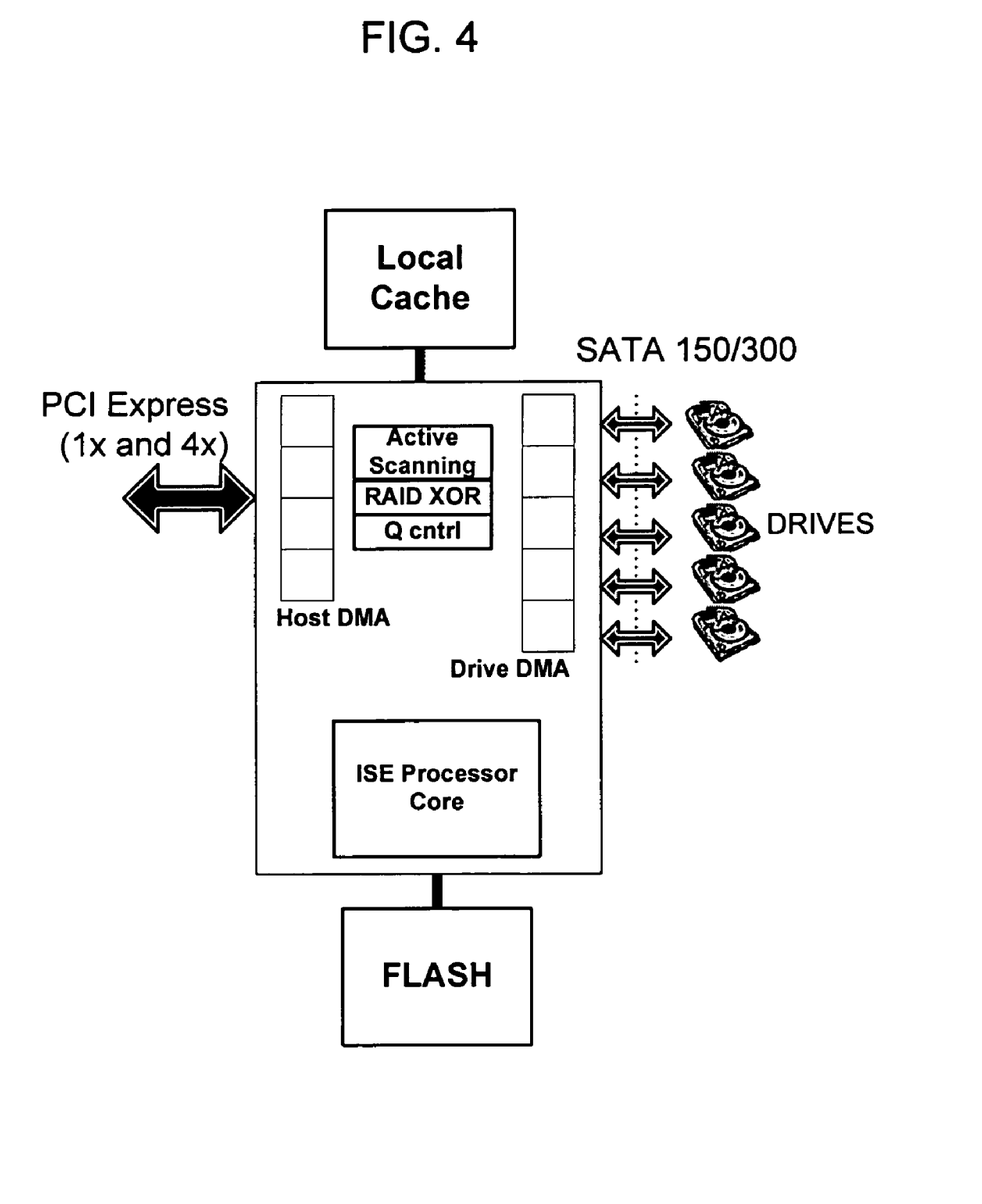
FIG. 4 is a simplified hardware block diagram illustrating an alternative embodiment of an ISE consistent the present invention.

FIG. 4 is a simplified block diagram of another embodiment of the storage engine. Embodiments similar to those of FIG. 3 or 4 may be conveniently implemented as part of a disk controller unit, for example on a motherboard or daughterboard. In this example, a 100 MHz dedicated storage processor is provided, though these could be substantially higher or lower in frequency depending on the desired functions to be supported and performance requirements. The cache may include up to 1 Gbyte or more, depending on application requirements.

In the example of FIG. 4, the data path bandwidths can be 2 GB/s cache; 250 MB/s (1×) or 1 GB/s (4×) PCI express host interface; and 1.2 GB/s drive. Another embodiment implements active scanning and matching of data up to say 512 64-bit words, for applications like virus signature scanning. RAID level 0,1,XL,5 can be included. Management of data streams and data stream queue is also possible prior to transferring data to and from the host bus.

OPERATION

In operation, there are two general types of operations. According to a first mode, standard file operations like file copy and file move are intercepted by a file system filter and sent directly to the ISE to move data blocks between drives. In a second mode, an API is defined for third party applications like antivirus software, backup software, disk imaging, disk defragmentation utility, etc. Each of these is discussed in turn.

Figure 5:
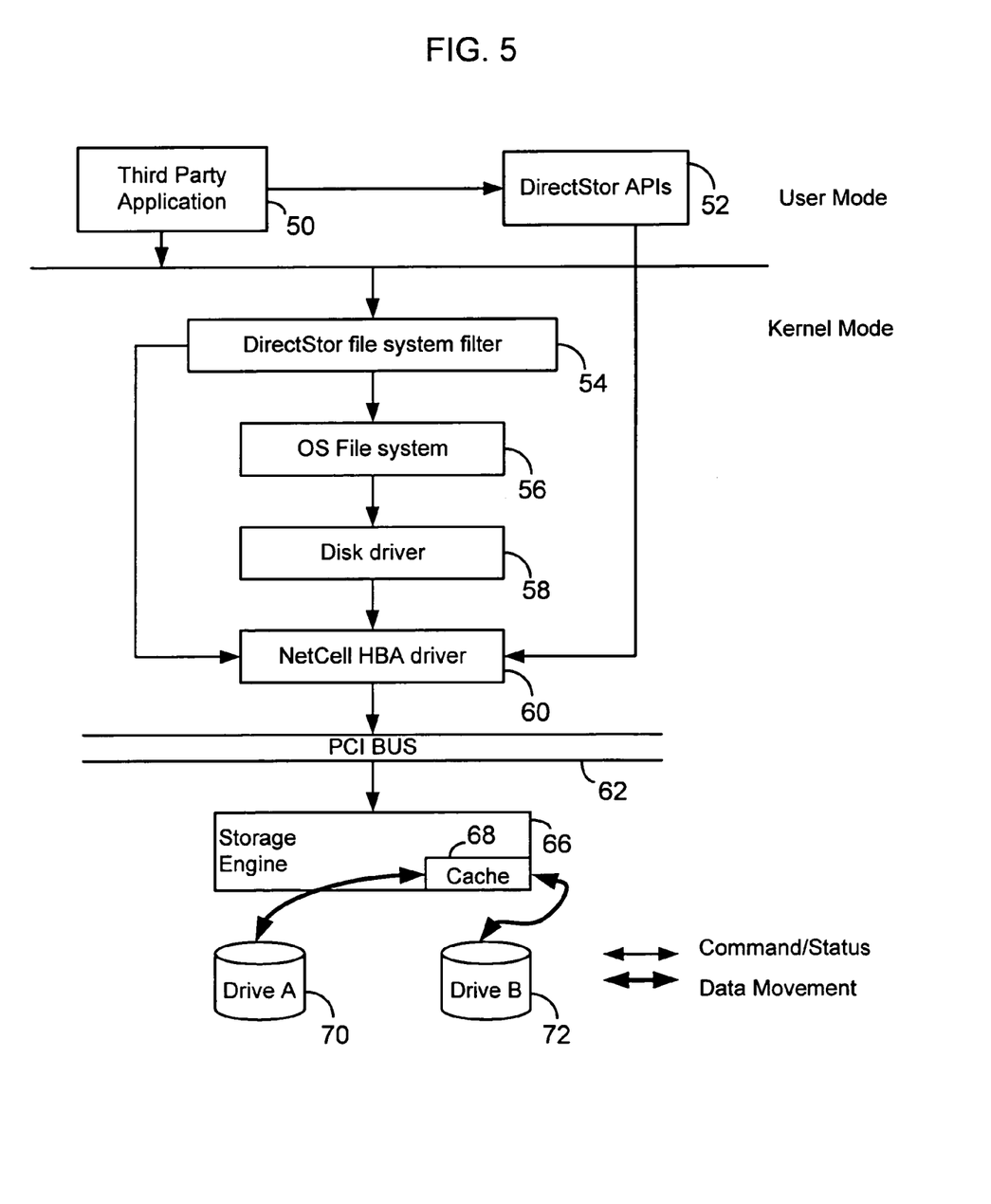
FIG. 5 is a simplified software block diagram illustrating one embodiment of an ISE consistent the present invention.

Referring now to FIG. 5, this simplified command and data flow diagram shows an application program 50 that may or may not employ DirectStor API commands. A file system filter module 54 monitors commands to the OS file system 56. It checks whether a given command is directed to a disk drive currently attached to a controller associated with the storage engine 66. If the command is directed to such a drive (e.g., drive B (72) in FIG. 5) and if a command is recognized by the filter 54 as one of a predetermined set of commands that it can process, the filter 54 intercepts the command, so that it does not reach the standard OS file system implemented within the kernel 56 and standard disk driver code 58. Instead, the filter 54 sends one or more commands, using the DirectStor API, directly to a special driver 60 which is equipped to implement that API. The driver 60 is arranged to recognize DirectStor API commands and forward them directly to the storage engine 66 for execution.

In another embodiment, a third-party application 50 itself utilizes DS API 52 in its code. Thus, the application sends commands directly to the driver 60 which, in turn, forwards them to the storage engine 66. The storage engine executes code, responsive to the DS API, to carry out disk drive operations like move and copy locally, meaning without placing any data on the PCI bus 62. Each call to the engine is assigned a tag for identification, as further illustrated below.

The engine 66 optionally can include a cache memory 68 for buffering data transfers to and from attached drives A (70) and or B (72) without traversing the PCI local bus and without using host CPU cycles until the operation is completed. As mentioned, any suitable random-access memory can be used to implement the cache, such as DRAM or SDRAM. In one embodiment, a disk controller PCB includes the storage engine and cache on board, together with host and drive interfaces.

These APIs are defined for the ISVs like Antivirus, Gaming, streaming digital media intensive applications, applications that may require private secure hidden storage space, Backup and defragmentation software. By calling these APIs the applications can send the command directly to NET-CELL™ ISE.

The APIs can he implemented/released in any of various forms, including without limitation:

Dynamic Link Library(DLL).
WINDOWS® service.
COM object.

Following is an illustrative example of an ISE ATA command interface between the ISE-enabled host application/library/device driver and an ISE in accordance with one embodiment of the present invention. This embodiment is referred to by the trademark "DirectStor" as shorthand for an intelligent storage engine.

DirectStor Illustrative Command Feature Set

Block Copy/Move Command
1. Description

These command/subcommands are defined to copy or move block of data between the two arrays or to move data within the same array. The second array can be either an internal array connected to the same card as the first array or can be an external array connected to the eSATA port.

2. Command code: 83h
3. Sub commands

The contents of previous Feature Register specify the subcommand.
MOVE_SET_SRC_LBA
MOVE_SET_LAST_LBA
MOVE_SET_DEST_LBA
MOVE_PROCEED
MOVE_SUSPEND
MOVE_ABORT
MOVE_STATUS
MOVE_SET_SRC_LBA Sub command to set the starting LBA of the source array.

| Register | | 7 | 6 | 5 | 4 | 3 | 2 | 1 | 0 |
|---|---|---|---|---|---|---|---|---|---|
| Inputs | | | | | | | | | |
| Features | Current | | | E5h (Object Array) | | | | | |
| | Previous | | | C1h | | | | | |
| Sector | Current | Destination Array | | | | Source Array | | | |
| Count | Previous | Command Tag | | | | | | | |
| LBA Low | Current | LBA (7:0) | | | | | | | |
| | Previous | LBA (31:24) | | | | | | | |
| LBA Mid | Current | LBA (15:8) | | | | | | | |
| | Previous | LBA (39:32) | | | | | | | |
| LBA High | Current | LBA (23:16) | | | | | | | |
| | Previous | LBA (47:40) | | | | | | | |
| Device | | obs | LBA | obs | DEV | Host Device Index | | | |
| Command | | 83h | | | | | | | |

Notes:
The command tag is any 8-bit positive number.
It must match the 1st command of sequence.

| Outputs | | | | | | | | | |
|---|---|---|---|---|---|---|---|---|---|
| Error | | | | | | | | | |
| Sector | HOB = 0 | Destination Array | | | | Source Array | | | |
| Count | HOB = 1 | Command Tag | | | | | | | |
| LBA Low | HOB = 0 | LBA (7:0) | | | | | | | |
| | HOB = 1 | LBA (31:24) | | | | | | | |
| LBA Mid | HOB = 0 | LBA (15:8) | | | | | | | |
| | HOB = 1 | LBA (39:32) | | | | | | | |
| LBA High | HOB = 0 | LBA (23:16) | | | | | | | |
| | HOB = 1 | LBA (47:40) | | | | | | | |
| Device | | obs | LBA | obs | DEV | Host Device Index | | | |
| Status | | | | | | | | | |

Notes:
If there is status error, check the Error register values to determine errors.
The command tag is any 8-digit positive number.

MOVE_SET_LAST_LBA

Sub command to set the ending LBA of the source array.

| Register | 7 | 6 | 5 | 4 | 3 | 2 | 1 | 0 |
|---|---|---|---|---|---|---|---|---|
| Inputs | | | | | | | | |
| Features | Current | | | E5h (Object Array) | | | | |
| | Previous | | | C0h | | | | |
| Sector | Current | Destination Array | | | | Source Array | | |
| Count | Previous | | | Command Tag | | | | |
| LBA Low | Current | | | LBA (7:0) | | | | |
| | Previous | | | LBA (31:24) | | | | |
| LBA Mid | Current | | | LBA (15:8) | | | | |
| | Previous | | | LBA (39:32) | | | | |
| LBA High | Current | | | LBA (23:16) | | | | |
| | Previous | | | LBA (47:40) | | | | |
| Device | | obs | LBA | obs | DEV | Host Device Index | | |
| Command | | | | 83h | | | | |

Notes:
The command tag is any 8-bit positive number.
It must match the 1st command of sequence.

| | | | | | Outputs | | | |
|---|---|---|---|---|---|---|---|---|
| Error | | | | | | | | |
| Sector | HOB = 0 | Destination Array | | | | Source Array | | |
| Count | HOB = 1 | | | Command Tag | | | | |
| LBA Low | HOB = 0 | | | LBA (7:0) | | | | |
| | HOB = 1 | | | LBA (31:24) | | | | |
| LBA Mid | HOB = 0 | | | LBA (15:8) | | | | |
| | HOB = 1 | | | LBA (39:32) | | | | |
| LBA High | HOB = 0 | | | LBA (23:16) | | | | |
| | HOB = 1 | | | LBA (47:40) | | | | |
| Device | | obs | LBA | obs | DEV | Host Device Index | | |
| Status | | | | | | | | |

Notes:
If there is status error, check the Error register values to determine errors.
The command tag is any 8-digit positive number.

MOVE_SET_DEST_LBA

Sub command to set the starting LBA of the destination array.

| Register | 7 | 6 | 5 | 4 | 3 | 2 | 1 | 0 |
|---|---|---|---|---|---|---|---|---|
| Inputs | | | | | | | | |
| Features | Current | | | E5h (Object Array) | | | | |
| | Previous | | | C2h | | | | |
| Sector | Current | Destination Array | | | | Source Array | | |
| Count | Previous | | | Command Tag | | | | |
| LBA Low | Current | | | LBA (7:0) | | | | |
| | Previous | | | LBA (31:24) | | | | |
| LBA Mid | Current | | | LBA (15:8) | | | | |
| | Previous | | | LBA (39:32) | | | | |
| LBA High | Current | | | LBA (23:16) | | | | |
| | Previous | | | LBA (47:40) | | | | |
| Device | | obs | LBA | obs | DEV | Host Device Index | | |
| Command | | | | 83h | | | | |

Notes:
The command tag is any 8-bit positive number.
It must match the 1st command of sequence.

| | | | | | Outputs | | | |
|---|---|---|---|---|---|---|---|---|
| Error | | | | | | | | |
| Sector | HOB = 0 | Destination Array | | | | Source Array | | |
| Count | HOB = 1 | | | Command Tag | | | | |
| LBA Low | HOB = 0 | | | LBA (7:0) | | | | |
| | HOB = 1 | | | LBA (31:24) | | | | |
| LBA Mid | HOB = 0 | | | LBA (15:8) | | | | |
| | HOB = 1 | | | LBA (39:32) | | | | |
| LBA High | HOB = 0 | | | LBA (23:16) | | | | |
| | HOB = 1 | | | LBA (47:40) | | | | |
| Device | | obs | LBA | obs | DEV | Host Device Index | | |
| Status | | | | | | | | |

Notes:
If there is status error, check the Error register values to determine errors.
The command tag is an 8-digit positive number.

MOVE_PROCEED

Sub command to proceed the execution of the block copy/move command issued.

| Register | 7 | 6 | 5 | 4 | 3 | 2 | 1 | 0 |
|---|---|---|---|---|---|---|---|---|
| Inputs | | | | | | | | |
| Features | Current | | | E5h (Object Array) | | | | |
| | Previous | | | D2h | | | | |
| Sector | Current | Destination Array | | | | Source Array | | |
| Count | Previous | | | Command Tag | | | | |
| LBA Low | Current | | | Reserved | | | | |
| | Previous | | | Reserved | | | | |
| LBA Mid | Current | | | Reserved | | | | |
| | Previous | | | Reserved | | | | |
| LBA High | Current | | | Reserved | | | | |
| | Previous | | | Reserved | | | | |
| Device | | obs | LBA | obs | DEV | Host Device Index | | |
| Command | | | | 83h | | | | |

Notes:
The command tag is any 8-bit positive number.
It must match the 1st command of sequence.

| | | | | | Outputs | | | |
|---|---|---|---|---|---|---|---|---|
| Error | | | | | | | | |
| Sector | HOB = 0 | Destination Array | | | | Source Array | | |
| Count | HOB = 1 | | | Command Tag | | | | |
| LBA Low | HOB = 0 | | | Reserved | | | | |
| | HOB = 1 | | | Reserved | | | | |
| LBA Mid | HOB = 0 | | | Reserved | | | | |
| | HOB = 1 | | | Reserved | | | | |
| LBA High | HOB = 0 | | | Reserved | | | | |
| | HOB = 1 | | | Reserved | | | | |
| Device | | obs | LBA | obs | DEV | Host Device Index | | |
| Status | | | | | | | | |

Notes:
If there is status error, check the Error register values to determine errors.
The command tag is an 8-digit positive number.

MOVE_SUSPEND

Sub command to suspend the execution of the block copy/move command issued.

| Register | 7 | 6 | 5 | 4 | 3 | 2 | 1 | 0 |
|---|---|---|---|---|---|---|---|---|
| Inputs | | | | | | | | |
| Features | Current | | | E5h (Object Array) | | | | |
| | Previous | | | D0h | | | | |
| Sector | Current | Destination Array | | | | Source Array | | |
| Count | Previous | | | Command Tag | | | | |
| LBA Low | Current | | | Reserved | | | | |
| | Previous | | | Reserved | | | | |
| LBA Mid | Current | | | Reserved | | | | |
| | Previous | | | Reserved | | | | |
| LBA High | Current | | | Reserved | | | | |
| | Previous | | | Reserved | | | | |
| Device | | obs | LBA | obs | DEV | Host Device Index | | |
| Command | | | | 83h | | | | |

Notes:
The command tag is any 8-bit positive number.
It must match the 1st command of sequence.

-continued

| Outputs | | | | | | |
|---|---|---|---|---|---|---|
| Error | | | | | | |
| Sector | HOB = 0 | Destination Array | | | Source Array | |
| Count | HOB = 1 | | Command Tag | | | |
| LBA Low | HOB = 0 | | Reserved | | | |
| | HOB = 1 | | Reserved | | | |
| LBA Mid | HOB = 0 | | Reserved | | | |
| | HOB = 1 | | Reserved | | | |
| LBA High | HOB = 0 | | Reserved | | | |
| | HOB = 1 | | Reserved | | | |
| Device | | obs LBA | obs | DEV | Host Device Index | |
| Status | | | | | | |

Notes:
If there is status error, check the Error register values to determine errors.
The command tag is any 8-digit positive number.

MOVE_ABORT

Sub command to abort the block copy/move command being issued.

| Register | 7 | 6 | 5 | 4 | 3 | 2 | 1 | 0 |
|---|---|---|---|---|---|---|---|---|

| Inputs | | | | | | |
|---|---|---|---|---|---|---|
| Features | Current | | E5h (Object Array) | | | |
| | Previous | | D9h | | | |
| Sector | Current | Destination Array | | | Source Array | |
| Count | Previous | | Command Tag | | | |
| LBA Low | Current | | Reserved | | | |
| | Previous | | Reserved | | | |
| LBA Mid | Current | | Reserved | | | |
| | Previous | | Reserved | | | |
| LBA High | Current | | Reserved | | | |
| | Previous | | Reserved | | | |
| Device | | obs LBA | obs | DEV | Host Device Index | |
| Command | | | 83h | | | |

Notes:
The command tag is any 8-bit positive number.
It must match the 1st command of sequence.

| Outputs | | | | | | |
|---|---|---|---|---|---|---|
| Error | | | | | | |
| Sector | HOB = 0 | Destination Array | | | Source Array | |
| Count | HOB = 1 | | Command Tag | | | |
| LBA Low | HOB = 0 | | Reserved | | | |
| | HOB = 1 | | Reserved | | | |
| LBA Mid | HOB = 0 | | Reserved | | | |
| | HOB = 1 | | Reserved | | | |
| LBA High | HOB = 0 | | Reserved | | | |
| | HOB = 1 | | Reserved | | | |
| Device | | obs LBA | obs | DEV | Host Device Index | |
| Status | | | | | | |

Notes:
If there is status error, check the Error register values to determine errors.
The command tag is any 8-digit positive number.

MOVE_STATUS

Sub command to get the progress status of the block copy/move command being issued.

| Register | 7 | 6 | 5 | 4 | 3 | 2 | 1 | 0 |
|---|---|---|---|---|---|---|---|---|

| Inputs | | | | | | |
|---|---|---|---|---|---|---|
| Features | Current | | E5h (Object Array) | | | |
| | Previous | | 00h | | | |
| Sector | Current | Destination Array | | | Source Array | |
| Count | Previous | | Command Tag | | | |
| LBA Low | Current | | Reserved | | | |
| | Previous | | Reserved | | | |
| LBA Mid | Current | | Reserved | | | |
| | Previous | | Reserved | | | |
| LBA High | Current | | Reserved | | | |
| | Previous | | Reserved | | | |
| Device | | obs LBA | obs | DEV | Host Device Index | |
| Command | | | 83h | | | |

Notes:
The command tag is any 8-bit positive number.
It must match the 1st command of sequence.

| Outputs | | | | | | |
|---|---|---|---|---|---|---|
| Error | | | | | | |
| Sector | HOB = 0 | Destination Array | | | Source Array | |
| Count | HOB = 1 | | Command Tag | | | |
| LBA Low | HOB = 0 | | Reserved | | | |
| | HOB = 1 | | Reserved | | | |
| LBA Mid | HOB = 0 | | Reserved | | | |
| | HOB = 1 | | Reserved | | | |
| LBA High | HOB = 0 | | Reserved | | | |
| | HOB = 1 | | Reserved | | | |
| Device | | obs LBA | obs | DEV | Host Device Index | |
| Status | | | | | | |

Notes:
If there is status error, check the Error register values to determine errors.
The command tag is any 8-digit positive number.

Following are some examples of high-level API's consistent with the present invention. These are merely illustrative and not exhaustive. Some embodiments of the present invention do not require use of an API; some implementations will be transparent to the application programs.

Fast Block Move APIs
   DS_DiskdataBlockCopy
   This function copies a block of data from one location to another location on the same disk volume or another disk volume connected to ISE.

```
int DS_ DiskdataBlockCopy (
    DS_REQUEST Dsr,
    DS_VOL_BLOCK_LOCATION *DestBlockLocation,
    DS_VOL_BLOCK_LOCATION *SrcBlockLocation,
    PFN_PROGRESS ProgressCallback
    );
```

Parameters
  Dsr
    [in] DirectStor request parameters. Each request is associated with a Tag value.
  The caller is notified through callback function with this Tag value. The caller of the API can abort the operation by calling Abort API with the same Tag.
  DestBlockLocation
    [in] Contains location information of the destination volume block.
  SrcBlockLocation
    [in] Contains location information of the Source volume block.
  Progress Callback
    [in] Pointer to the callback function which will be called at a specified interval to notify caller progress of the command issued.

Return Values

Returns zero if successful and nonzero value if there is an error. Please see section 5.5 for the description of error codes.

DS_DiskdataBlockMove

This function move block of data from one location to another location on the same disk volume or another disk volume connected to ISE.

```
int DS_ DiskdataBlockMove (
        DS_REQUEST Dsr,
        DS_VOL_BLOCK_LOCATION *DestBlockLocation,
        DS_VOL_BLOCK_LOCATION *SrcBlockLocation,
        PFN_PROGRESS ProgressCallback
        );
```

Parameters
Dsr
[in] DirectStor request parameters. Each request is associated with a Tag value.
The caller is notified through callback function with this Tag value. The caller of the API can abort the operation by calling Abort API with the same Tag.
DestBlockLocation
[in] Contains location information of the destination volume block.
SrcBlockLocation
[in] Contains location information of the Source volume block.
ProgressCallback
[in] Pointer to the callback function which will be called at a specified interval to notify caller progress of the command issued.

Return Values

Returns zero if successful and nonzero value if there is an error. Please see section 5.5 for the description of error codes.
DS_DiskdataBlockErase This function erase block of data from disk volume.

```
int DS_ DiskdataBlockErase (
        DS_REQUEST Dsr,
        DS_VOL_BLOCK_LOCATION *BlockLocation,
        PFN_PROGRESS ProgressCallback
        );
```

Parameters
Dsr
[in] DirectStor request parameters. Each request is associated with a Tag value.
The caller is notified through callback function with this Tag value. The caller of the API can abort the operation by calling Abort API with the same Tag.
BlockLocation
[in] Contains location information of the volume block.
ProgressCallback
[in] Pointer to the callback function which will be called at a specified interval to notify caller progress of the command issued.

Return Values

Returns zero if successful and nonzero value if there is an error. Please see section 5.5 for the description of error codes.
DS_DiskdataBlockFill This function fill block of disk volume with a given data pattern.

```
int DS_ DiskdataBlockFill (
        DS_REQUEST Dsr,
        DS_VOL_BLOCK_LOCATION *BlockLocation,
        ULONG Pattern,
        PFN_PROGRESS ProgressCallback
        );
```

Parameters
Dsr
[in] DirectStor request parameters. Each request is associated with a Tag value.
The caller is notified through callback function with this Tag value. The caller of the API can abort the operation by calling Abort API with the same Tag.
BlockLocation
[in] Contains location information of the volume block.
Pattern
[in] Contains data pattern.
Progress Callback
[in] Pointer to the callback function which will be called at a specified interval to notify caller progress of the command issued.

Return Values

Returns zero if successful and nonzero value if there is an error. Please see section 5.5 for the description of error codes
DS_CreateDiskImage This function create complete disk image of the volume on a target volume.

```
int DS_CreateDiskImage (
        DS_
        char DestVolume,
        char SrcVolume,
        USHORT CommadTag,
        PFN_PROGRESS ProgressCallback
        );
```

Parameters
Volume
[in] Destination Volume letter assigned by OS.
Volume
[in] Source Volume letter assigned by OS.
CommandTag
[in] Each DirectStor API is tagged with command tag. This tag is passed in the caller supplied callback function. This will help caller have a single callback function for all or group of APIs. Also, the caller of the API can abort the operation by passing the same tag to the abort command API.
Progress Callback
[in] Pointer to the callback function which will be called at a specified interval to notify caller progress of the command issued.

Return Values

Returns zero if successful and nonzero value if there is an error. Please see section 5.5 for the description of error codes.
DS_DiskdataBlockRead application calls this function to read block of data from the disk volume.

```
int DS_ DiskdataBlockRead (
        DS_REQUEST Dsr,
        DS_VOL_BLOCK_LOCATION *BlockLocation,
        PBYTE DataBuffer
        );
```

Parameters
Dsr
[in] DirectStor request parameters. Each request is associated with a Tag value.
The caller is notified through callback function with this Tag value. The caller of the API can abort the operation by calling Abort API with the same Tag.
BlockLocation
[in] Contains location information of the volume block.
DataBuffer
[in] Pointer to the input data buffer.

Return Values

Returns zero if successful and nonzero value if there is an error. Please see section 5.5 for the description of error codes.
DS_DiskdataBlockWrite Application calls this function to write block of data to the disk volume.

```
int DS_ DiskdataBlockWrite (
        DS_REQUEST Dsr,
        DS_VOL_BLOCK_LOCATION *BlockLocation,
        PBYTE DataBuffer
        );
```

Parameters
Dsr
[in] DirectStor request parameters. Each request is associated with a Tag value.
The caller is notified through callback function with this Tag value. The caller of the API can abort the operation by calling Abort API with the same Tag.
Blocklocation
[in] Contains location information of the volume block.
DataBuffer
[in] Pointer to the output data buffer.

Return Values

Returns zero if successful and nonzero value if there is an error. Please see section 5.5 for the description of error codes.
DS_Abort Use this function to abort the command issued to ISE.

```
int DS_ Abort (
        DS_REQUEST Dsr,
        );
```

Parameters
Dsr
[in] DirectStor request parameters. Each request is associated with a Tag value.
The caller is notified through callback function with this Tag value. The caller of the API can abort the operation by calling Abort API with the same Tag.

Return Values

Returns zero if successful and nonzero value if there is an error.
Illustrative Antivirus APIs
DS_ScanVolumeforSignature This function scan volume for the specified signature. The application can pass the actual virus signature or a tag that points to a signature stored on the secure disk zone. The callback function passed is called at a specified interval to notify progress.

```
int DS_ScanVolumeforSignature (
        char Volume,
        USHORT CommadTag,
        DS_SIGNATURE *pSignature
        PFN_PROGRESS ProgressCallback
        );
```

Parameters
Volume
[in] Target Volume letter assigned by OS.
CommandTag
[in] Each DirectStor API is tagged with command tag. This tag is passed in the caller supplied callback function. This will help caller have a single callback function for all or group of APIs. Also, the caller of the API can abort the operation by passing the same tag to the abort command API.
pSignature
[in] virus signature. This can be an actual virus signature or can be a tag that points to a signature stored on the secure zone. Please see the data structures section more info.

Return Values

Returns zero if successful and nonzero value if there is an error. Please see section 5.5 for the description of error codes.
Other illustrative functions can include the following:
DS_AbortScan
DS_ScanVolumeBlock
DS_StoreSignature
DS_WriteToSecureDiskZone
DS_ReadFromSecureDiskZone
DS_SavePassword
DS_VerifyPassword Data Structures
DS_REQUEST
In one embodiment, each request to the ISE is associated with a Tag value. This Tag is passed back to the caller in callers callback function. This will help caller have a single callback function for all or group of APIS. The caller of the API can abort the operation by calling Abort API with the same Tag.

```
typedef struct
{
WORD RequestTag;
DWORD Timeout;              /*Timeout in milliseconds, enforced by
                              DirectStor to 30 sec maximum */
DWORD NotificationInterval  /*Interval for the callback function in
                              milliseconds, enforced
                              by DirectStor to 0.5 sec minimum
                              and 30 sec maximum */
```

-continued

```
int ProcessID;
int ThreadID;
}DS_REQUEST;
    DS_VOL_BLOCK_LOCATION
typedef struct
{
char Volume;              /* Disk volume letter assigned by OS */
WORD ControlWord;             /* 1 = Entire Volume,
                               2 = Volume Block */
ULONGLONG StartLBA;    /* Starting LBA of volume block */
ULONGLONG SizeInSectors;      /*Size of volume block in
                               sectors */
    DS_SIGNATURE      /* Search for specified reference signature */
```

In accordance with the foregoing description, some of the main features and aspects of the invention can be described as including a storage engine apparatus arranged for direct attachment to at least one hard disk drive, and configured to perform a function normally performed by a host CPU attached to the storage processing device via a high speed local bus or host serial link as a direct attached storage device. In general, the storage engine receives a command, performs a data movement or processing instruction on data stored on the hard disk drive or drives, or on data cached in a local RAM store destined for the host or disk drive(s), responsive to the received command, and returns a result to said attached host processor. As shown above, such commands can be to move or copy data, within a drive or across drives, or perform operations such as a virus scan. Importantly, these operations are carried out by the storage engine with it moving user data traffic over the local bus or host serial link.

Commands that will employ the storage engine can occur by intercepting commands from the host processor to the operating system, or via a predetermined applications programming interface (API). This makes special data operations available for application programs, such as anti-virus programs, without loading the host CPU and or local bus. Such instructions can identify target data based on logical address block (LBA) source and destination information.

A storage engine of the type disclosed herein can be implemented and used in various ways including substantially in a single integrated circuit; substantially in a single circuit board; integrated in a PC; implemented in a digital video recorder system; implemented in a digital video system, or in numerous other ways as those skilled in the art will appreciate in view of the foregoing.

It will be obvious to those having skill in the art that many changes may be made to the details of the above-described embodiments without departing from the underlying principles of the invention. The scope of the present invention should, therefore, be determined only by the following claims.

The invention claimed is:

1. An intelligent storage engine apparatus for reducing host bus traffic in connection with attached storage operations comprising:
   a host interface for receiving at least one predetermined instruction or function call from a host application to perform data transfers to at least one attached disk drive;
   a drive interface to couple an associated intelligent storage engine to the at least one attached disk drive for the data transfers; and
   a processor on board the intelligent storage engine for performing the data transfers with the at least one attached disk drive responsive to the received predetermined instruction;
   the intelligent storage engine arranged for performing the data transfers with the at least one attached disk drive corresponding to the at least one predetermined instruction or function call without placing user data on a host bus or host serial link; and executing operations within the host application to complete an OS call operation by circumventing built-in operating kernel system file caching software layers and hardware interface function calls, and instead sending at least one corresponding command directly to the intelligent storage engine.

2. The intelligent storage engine apparatus according to claim 1 wherein the drive interface comprises a drive switch for configurable connection to multiple disk drives.

3. The intelligent storage engine apparatus according to claim 1 including a DMA component for DMA transfers with an attached host.

4. The intelligent storage engine apparatus according to claim 1 and arranged to receive a data movement or processing instruction from a host CPU via a predetermined applications programming interface (API).

5. The intelligent storage engine apparatus according to claim 1 including a local cache memory for temporary storage of the user data.

6. The intelligent storage engine apparatus according to claim 1 including means for scanning data in a selected file stream on the fly and matching that scanning data against a predetermined reference sequence.

7. The intelligent storage engine apparatus according to claim 1 wherein the predetermined instruction or function call includes commands directed to the at least one attached disk drive.

8. The intelligent storage engine apparatus according to claim 1 further comprising a file system filter module for monitoring for the predetermined instruction or function call to the OS file system.

9. The intelligent storage engine apparatus according to claim 8 wherein the file system filter module intercepts the predetermined instruction or function call to the OS file system.

10. The intelligent storage engine apparatus according to claim 8 wherein the file system filter module sends the predetermined instruction or function call to an intelligent storage engine driver.

11. The intelligent storage engine apparatus according to claim 10 wherein the intelligent storage engine driver forwards the predetermined instruction or function call to the intelligent storage engine.

12. A method of executing disk drive operations with reduced host local bus traffic, the method comprising:
   defining at least one host application function that requires access to at least one attached disk drive and having a corresponding function call to perform data transfers to the at least one attached disk drive;
   implementing the function call in a storage engine apparatus;
   interfacing the storage engine apparatus to a host local bus and to the at least one attached disk drive;
   monitoring the host local bus so as to detect the function call when asserted;
   responsive to the detected function call, executing the corresponding function call in the storage engine apparatus without placing user data on the host local bus;
   after completion returning a result of the executed function over the host local bus; and
   executing operations within the host application to complete an OS call operation by circumventing built-in operating kernel system file caching software layers and hardware interface function calls, and instead sending at least one corresponding command directly to the storage engine apparatus.

13. The method of executing disk drive operations according to claim 12 wherein the functions implemented in the storage engine include file copy and file move operations.

14. The method according to claim 12 including moving data between two disk drives without loading the host local bus or serial connection.

15. A method of executing disk drive operations according to claim 12 including:
providing a file system filter module for monitoring commands to an operating system file system;
checking in the file system filter module whether a given command is directed to a disk drive currently attached to the storage engine apparatus; and
if a command is directed to an attached disk drive, and if the command is recognized by the filter module as one of a predetermined set of commands it can process, then intercepting the command and processing the command in the storage engine apparatus.

16. The method according to claim 15 including providing periodic information to a host on the status of an operation, queuing status of a requested operation, and providing an overall result when the operation is completed.

17. The method according to claim 16 wherein the operation comprises one of a file move from a first disk drive to a second disk drive, a file copy operation, a disk volume merge, a virus scan, a RAID drive-array rebuild.

18. The method according to claim 16 wherein the operation comprises a search of stored user data.

19. The method according to claim 15 wherein a final result comprises an indication to a host indicating that a requested operation did not complete or that the requested operation was completed successfully.

20. The method according to claim 15 wherein a final result comprises delivery of requested result data.

21. A method of executing disk drive operations with reduced local bus traffic, the method comprising:
defining at least one application function that requires access to at least one attached disk drive to perform data transfers to the at least one attached disk drive;
implementing the application function in a storage engine apparatus having a local processor and local memory;
interfacing the storage engine apparatus to a host local bus and to at least one attached disk drive;
receiving a function call from an application program via a predetermined API;
responsive to the received function call, executing a corresponding function in the storage engine apparatus without placing user data on the host local bus, the execution including accessing the at least one attached disk drive;
after completion returning a result of the executed function to the application program; and
executing operations within the host application to complete an OS call operation by circumventing built-in operating kernel system file caching software layers and hardware interface function calls, and instead sending at least one corresponding command directly to the storage engine apparatus.

22. The method according to claim 21 wherein the application program is an anti-virus application.

23. The method according to claim 21 wherein the API includes disk block operations.

24. The method according to claim 21 wherein the API includes searching operations.

* * * * *